(12) United States Patent
    Xiong et al.

(10) Patent No.: US 12,604,223 B2
(45) Date of Patent: Apr. 14, 2026

(54) TIME PERIOD CONFIGURATION METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventors: Yi Xiong, Beijing (CN); Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 329 days.

(21) Appl. No.: 18/269,220

(22) PCT Filed: Dec. 25, 2020

(86) PCT No.: PCT/CN2020/139534
    § 371 (c)(1),
    (2) Date: Jun. 22, 2023

(87) PCT Pub. No.: WO2022/134037
    PCT Pub. Date: Jun. 30, 2022

(65) Prior Publication Data
    US 2024/0080687 A1      Mar. 7, 2024

(51) Int. Cl.
    *H04W 24/08*      (2009.01)
    *H04W 48/08*      (2009.01)
    *H04W 56/00*      (2009.01)
    *H04W 4/50*       (2018.01)

(52) U.S. Cl.
    CPC ........... *H04W 24/08* (2013.01); *H04W 48/08* (2013.01); *H04W 56/0035* (2013.01); *H04W 4/50* (2018.02)

(58) Field of Classification Search
    CPC ..... H04W 24/00; H04W 24/08; H04W 48/00; H04W 48/08; H04W 56/00; H04W 56/0035; H04W 4/50; H04W 56/001; H04W 56/002; H04L 7/00; H04L 27/2655; H04L 5/0091; H04L 41/08; H04L 41/0803
    See application file for complete search history.

(56) References Cited

U.S. PATENT DOCUMENTS

2017/0094624 A1 *   3/2017   Balachandran ..... H04W 72/542
2018/0324678 A1 *  11/2018   Chen ....................... H04W 8/08
2019/0306891 A1 *  10/2019   Xiong ................... H04W 88/02
2019/0306892 A1 *  10/2019   Xiong ............... H04W 74/0833
                        (Continued)

OTHER PUBLICATIONS

European Patent Application No. 20966602.3, Search and Opinion dated Feb. 2, 2024, 14 pages.
                        (Continued)

*Primary Examiner* — Warner Wong
(74) *Attorney, Agent, or Firm* — Cozen O'Connor

(57) ABSTRACT

A method and an apparatus for configuration a period for SSB measurement. The method includes: detecting an SSB of a neighboring cell within the period for SSB measurement, in which the period for SSB measurement includes: an SSB measurement timing configuration (SMTC) window and/or a measurement gap; and reporting update indication information based on a detection result of the SSB, in which the update indication information is configured to update a period configuration at a network side, and the period configuration includes indication information for determining the period for SSB measurement.

16 Claims, 5 Drawing Sheets

(56)  References Cited

U.S. PATENT DOCUMENTS

| | | | |
|---|---|---|---|
| 2020/0205102 A1* | 6/2020 | Islam | H04W 72/0446 |
| 2020/0336260 A1* | 10/2020 | Liu | H04W 84/047 |
| 2021/0204234 A1* | 7/2021 | Xu | H04L 27/26025 |
| 2021/0235513 A1* | 7/2021 | Kim | H04W 56/001 |
| 2021/0329507 A1* | 10/2021 | Yao | H04W 36/0085 |
| 2022/0061004 A1* | 2/2022 | Wigard | H04W 36/0088 |
| 2022/0217034 A1* | 7/2022 | Han | H04L 5/0053 |
| 2022/0252736 A1* | 8/2022 | Fu | G01S 19/256 |
| 2022/0263569 A1* | 8/2022 | Fan | H04W 56/001 |
| 2022/0321310 A1* | 10/2022 | Jin | H04B 7/0695 |
| 2022/0338249 A1* | 10/2022 | Lei | H04L 5/006 |
| 2022/0353714 A1* | 11/2022 | Fu | H04B 7/1853 |
| 2022/0386263 A1* | 12/2022 | Miao | H04L 5/0091 |
| 2023/0030149 A1* | 2/2023 | Hou | H04B 7/195 |
| 2023/0080009 A1* | 3/2023 | Wang | H04L 5/0091 |
| | | | 370/252 |
| 2023/0121806 A1* | 4/2023 | Li | H04J 11/0073 |
| | | | 370/329 |
| 2023/0396328 A1* | 12/2023 | Wigard | H04B 7/1851 |
| 2023/0403593 A1* | 12/2023 | Hong | H04W 56/001 |
| 2024/0056948 A1* | 2/2024 | Wu | H04W 52/0206 |

OTHER PUBLICATIONS

Lenovo et al. "Considerations on measurements in NTN" 3GPP TSG-RAN WG2 Meeting 112 electronic, R2-2009863, Nov. 2020, 3 pages.

OPPO "Discussion on mobility management for connected mode UE in NTN" 3GPP TSG-RAN WG2 Meeting 112e, R2-2009112, 4 pages.

PCT/CN2020/139534, English translation of Search Report dated Aug. 30, 2021, 2 pages.

Huawei et al. "Discussion on SSB measurement in NTN", 3GPP TSG-RAN2 Meeting #108, R2-1915189, Nov. 2019, 5 pages.

* cited by examiner

TIME PERIOD CONFIGURATION METHOD AND APPARATUS, COMMUNICATION DEVICE, AND STORAGE MEDIUM

CROSS-REFERENCE TO RELATED APPLICATION

This application is a U.S. national phase application of International Application No. PCT/CN2020/139534, filed on Dec. 25, 2020, the content of which is hereby incorporated by reference in its entirety.

TECHNICAL FIELD

The disclosure relates to, but is not limited to, a field of wireless communication technologies, and more particularly to a method and an apparatus for configuring a period for synchronization signal block (SSB) measurement, a communication device, and a storage medium.

BACKGROUND

The fifth generation (5G) new radio (NR) introduces a non-terrestrial network (NTN). The NTN includes: a 5G satellite communication network. A high altitude of a satellite from the earth causes a large transmission delay of the NTN. Meanwhile, for different types of NTNs, satellites at different altitudes have different transmission delays.

SUMMARY

According to a first aspect of embodiments of the disclosure, there is provided a method for configuring a period for synchronous signal block (SSB) measurement. The method includes:

detecting an SSB of a neighboring cell within the period for SSB measurement, in which the period for SSB measurement includes: an SSB measurement timing configuration (SMTC) window and/or a measurement gap; and reporting update indication information based on a detection result of the SSB, in which the update indication information is configured to update a period configuration at a network side, and the period configuration includes indication information for determining the period for SSB measurement.

According to a second aspect of embodiments of the disclosure, there is provided a method for configuring a period for SSB measurement, applied to a serving cell. The method includes:

receiving update indication information reported by a terminal based on a detection result of an SSB of a neighboring cell; and updating a period configuration of the period for SSB measurement based on the update indication information, in which the period configuration includes indication information for determining the period for SSB measurement.

According to a third aspect of embodiments of the disclosure, there is provided a communication device. The communication device includes: a processor, a transceiver, a memory, and an executable program stored in the memory and executed by the processor. The processor is configured to execute the executable program to perform the method for configuring a period for SSB measurement according to the first aspect or the second aspect.

According to a fourth aspect of embodiments of the disclosure, there is provided a computer storage medium having an executable program stored thereon. When the executable program is executed by a processor, the processor is caused to implement the method for configuring a period for SSB measurement according to the first aspect or the second aspect when the executable program is executed by the processor.

It should be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of embodiments of the disclosure together with the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figure 1:
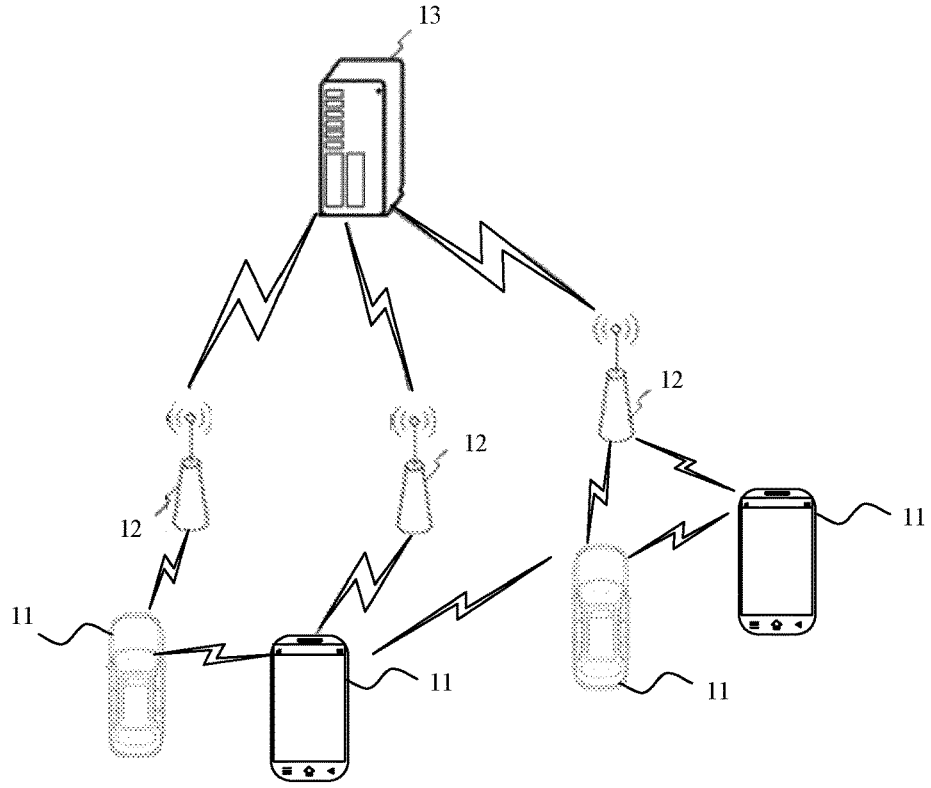
FIG. 1 is a schematic diagram illustrating a wireless communication system according to an exemplary embodiment.

Referring to FIG. 1, FIG. 1 is a schematic diagram illustrating a wireless communication system according to an embodiment of the disclosure. As illustrated in FIG. 1, the wireless communication system is a communication system based on the cellular mobile communication technology. The wireless communication system may include several UEs 11 and several base stations 12.

The UE 11 may be a device that provides voice and/or data connectivity to a user. The UE 11 can communicate with one or more core networks via a radio access network (RAN). The UE 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, or a user equipment (UE). Alternatively, the UE 11 may also be a device of an unmanned aerial vehicle. Alternatively, the UE 11 may also be a vehicle-mounted device, for example, the UE 11 may be a vehicle-mounted computer with a wireless communication function, or a wireless communication device externally connected to a vehicle-mounted computer. Alternatively, the UE 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. The wireless communication system may be a 5G system, also known as the new radio (NR) system or 5G NR system. Alternatively, the wireless communication system may also be a next-generation system of the 5G system. An access network in the 5G system may be called as a new generation radio access network (NG-RAN), or a machine-type communication (MTC) system.

The base station 12 may be a base station (eNB) in the 4G system. Alternatively, the base station 12 may be a base station (gNB) adopting a centralized and distributed architecture in the 5G system. When the base station 12 adopts the centralized and distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the UE 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the UEs 11, for example a vehicle to vehicle (V2V) communication, a vehicle to infrastructure (V2I) communication, vehicle to pedestrian (V2P) communication and other scenarios in the vehicle to everything (V2X) communication.

In some embodiments, the wireless communication system may also include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

Figure 2:
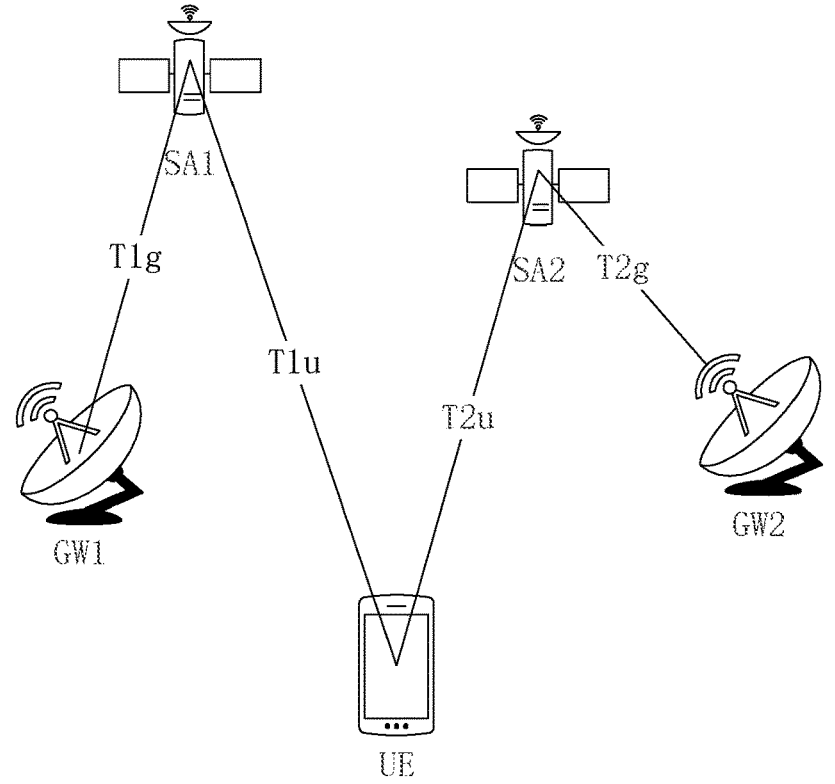
FIG. 2 is a schematic diagram illustrating an NTN system according to an exemplary embodiment.

In a terrestrial network (TN) system, a cell has a small radius, and transmission delays between the UE and different cells have a small difference, which is far less than a length of an SSB measurement timing configuration (SMTC) window/measurement gap. However, in an NTN system, due to a large cell radius, coverage areas of different satellites may have a large overlapping range. When a satellite 1 (SA) provides services for the UE, the UE may also be in a coverage range of a satellite 2/satellite 3. Considering mobility of the UE, the UE needs to perform measurement on a neighboring cell covered by the satellite 2 or satellite 3, and an influence of a transmission delay difference needs to be considered. As illustrated in FIG. 2, the satellite (SA1) is a serving cell satellite and the satellite (SA2) is a neighboring cell satellite. A transmission delay in receiving a signal of the serving cell by the UE may be represented as T1g (a transmission delay of a feeder link)+T1u (a transmission delay of a service link). A transmission delay in receiving a signal of the neighboring cell by the UE is T2u+T2g. The transmission delay difference is T1g+T1u−(T2g+T2u). Considering different distances from different satellites to the UE and a ground station, there may be a big gap between the transmission delay in receiving the signal of the serving cell by the UE and the transmission delay in receiving the signal of the neighboring cell by the UE. That is, T1g+T1u−(T2g+T2u) may not approach 0, and may be greater than a time length of the SMTC window/measurement gap.

When the SMTC window/measurement gap is configured without considering the transmission delay difference, the UE may miss an SSB/CSI-RS measurement window, and thus measurement may not be performed on a configured reference signal.

Embodiments of the disclosure provide a method and an apparatus for configuring a period for SSB measurement, a communication device, and a storage medium.

With the technical solution provided by embodiments of the disclosure, the period configuration of the period for SSB measurement of the neighboring cell is determined based on the detection result of the SSB of the neighboring cell from the terminal. In this way, compared with a fixed period configuration of the period for SSB measurement with a certain length, unnecessary resource occupation or occurrence of a situation that the SSB of the neighboring cell cannot be successfully measured may be reduced. Meanwhile, compared with updating the period configuration of the period for SSB measurement by frequently sending a radio resource control (RRC) signaling at a network side, an unnecessary update and a signaling overhead are reduced.

Figures 3, 4:
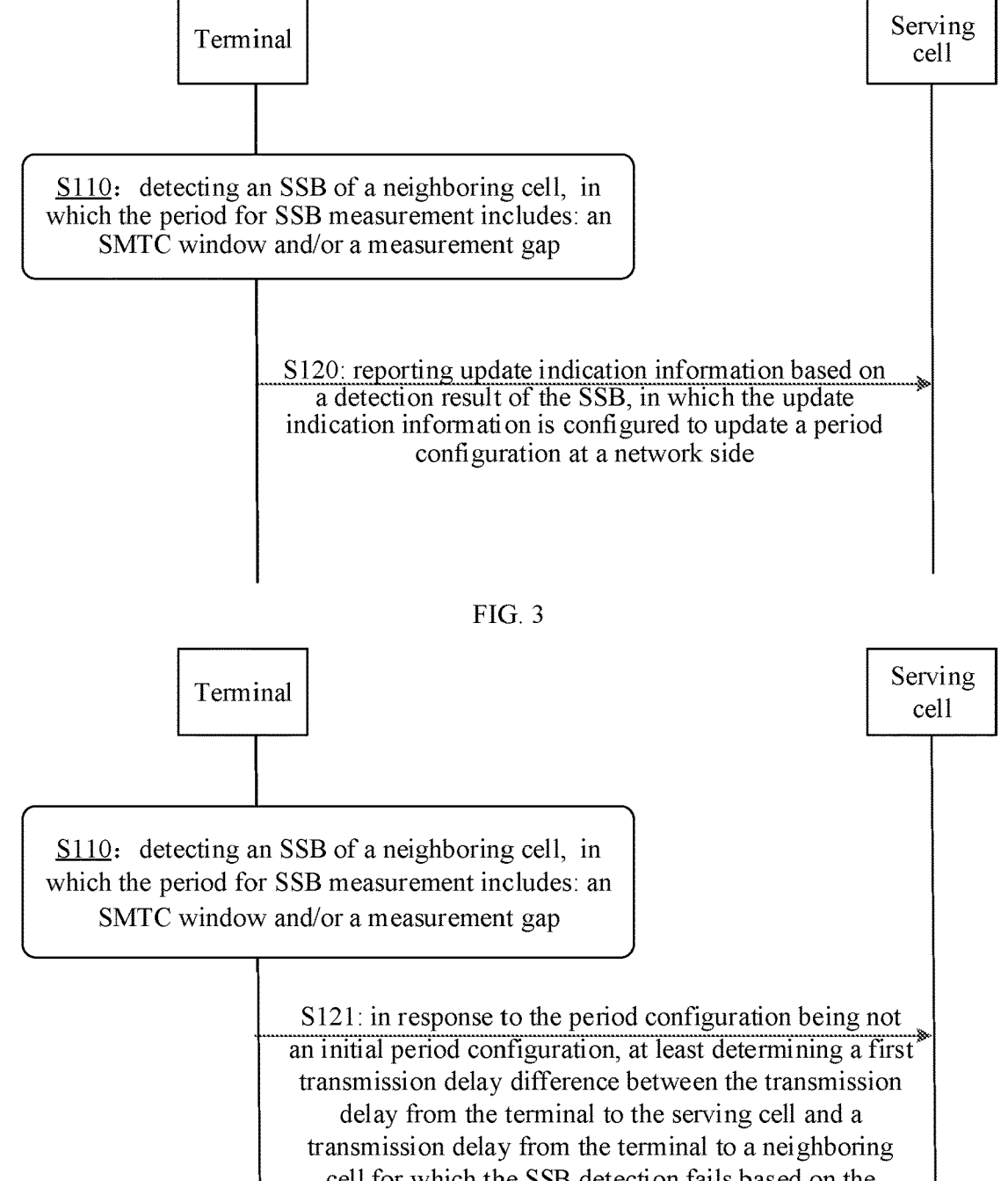
FIG. 3 is a flow chart illustrating a method for configuring a period for SSB measurement according to an exemplary embodiment.
FIG. 4 is a flow chart illustrating a method for configuring a period for SSB measurement according to an exemplary embodiment.

As illustrated in FIG. 3, embodiments of the disclosure provide a method for configuring a period for SSB measurement, which is applied to a terminal. The method includes the following steps.

S110, an SSB of a neighboring cell is detected within the period for SSB measurement, in which the period for SSB measurement includes: an SMTC window and/or a measurement gap.

S120, update indication information is reported based on a detection result of the SSB. The update indication information is configured to update a period configuration at a network side. The period configuration includes indication information for determining the period for SSB measurement.

In embodiment of the disclosure, the method for configuring a period for SSB measurement may be applied to various types of terminals, including but not limited to, a mobile phone, a tablet, a wearable device, a vehicle-mounted device or various types of intelligent devices. The intelligent device includes, but is not limited to: an intelligent home device, an intelligent office device or an intelligent teaching device.

The terminal provided in embodiments of the disclosure may be a terminal capable of accessing an NTN cell, such as, a satellite communication terminal. Of course, in some cases, some terminals support communication with both a TN cell and the NTN cell. The NTN cell is a communication cell in the NTN system. The TN cell may include a cell formed by a ground base station.

In embodiments of the disclosure, the neighboring cell may be the NTN cell of the serving cell. The serving cell here may be an NTN cell or a TN cell.

In embodiments of the disclosure, the terminal may determine the period for SSB measurement based on a received period configuration for determining the period for SSB measurement, for example, determining a distribution position of the period for SSB measurement in a time domain, and/or a time length of the period for SSB measurement.

During the period for SSB measurement determined based on the period configuration, the SSB of the neighboring cell may be detected, and the detection result indicating whether the SSB of the neighboring cell is successfully detected may be obtained. The period configuration may be a configuration of the SMTC window in a case that the period for SSB measurement is the SMTC window.

The period configuration may be a configuration of the measurement gap in a case that the period for SSB measurement is the measurement gap.

Exemplarily, the detection result may at least indicate whether the SSB of the corresponding neighboring cell is detected.

Exemplarily, the detection result may indicate whether the SSB of the corresponding neighboring cell is detected, and also indicate the number of SSBs detected during the period for SSB measurement determined based on a current period configuration, and/or a reference signal receiving power (RSRP) of the SSB, a reference signal receiving quality (RSRQ) of the SSB.

Based on the detection result, it may be determined whether a current period for SSB measurement meets a measurement requirement for the SSB of the neighboring cell, and then it may be determined whether the current period configuration needs to be updated based on the measurement requirement.

The terminal may receive a list of neighboring cells from the serving cell of the terminal. The list of neighbor cells includes cell identifications of the neighbor cells.

It may be determined whether the terminal has detected the SSBs of one or more neighboring cells based on the cell identifications in the list of neighboring cells when the SSBs of the neighboring cells are detected during the period for SSB measurement.

In one embodiment, the SSB may include a primary synchronization signal.

In another embodiment, the SSB includes: a primary synchronization signal and a secondary synchronization signal.

In a yet embodiment, the SSB includes: a primary synchronization signal, a secondary synchronization signal and a physical broadcast channel (PBCH).

In embodiments of the disclosure, when the terminal performs the SSB measurement for the neighboring cell, and it is determined that SSB detection for at least one neighboring cell fails based on the detection result, it means that the current period for SSB measurement may not be suitable for the terminal to perform measurement on the neighboring cell. In order to successfully detect the SSB of the neighboring cell, the update indication information may be reported based on the detection result of the SSB. In this way, after receiving the update indication information, the network side may update the period configuration of the period for SSB measurement under the trigger of the update indication information or based on information content of the update indication information.

In an embodiment, the update indication information may merely be an update instruction. The network side determines that the period for SSB measurement needs to be updated after receiving the update instruction. An update way and an update basis may be determined based on a preset update strategy. For example, the period of SSB measurement is increased based on a preset step size.

In another embodiment, the update indication information carries a transmission delay difference. The transmission delay difference may include:

a first transmission delay difference, in which the first transmission delay difference is a difference between a transmission delay from the terminal to the serving cell and a transmission delay from the terminal to each neighboring cell in a neighboring cell group where a neighboring cell for which the SSB detection fails is located;

and/or a second transmission delay difference, in which the second transmission delay difference is a difference between the transmission delay from the terminal to the serving cell and a transmission delay from the terminal to each neighboring cell in a neighboring cell group where a neighboring cell for which the SSB detection succeeds is located.

In an embodiment, the action at S120 may include: determining the transmission delay difference between the transmission delay from the terminal to the serving cell and the transmission delay from the terminal to the neighboring cell based on the detection result of the SSB, and reporting the update indication information based on the transmission delay difference.

Exemplarily, there are various contents of the update indication information, including but not limited to, at least one of:

a cell identification of the neighboring cell for which the SSB detection fails and the transmission delay difference; or a bit bitmap and the transmission delay difference. Different bits in the bit bitmap indicate different neighboring cells. In an embodiment, the transmission delay difference carried by the update indication information may be the first transmission delay difference above-mentioned.

Of course, the above is merely an example of the content of the update indication information, and the detailed implementation is not limited thereto.

Updating the period for SSB measurement here includes, but is not limited to, updating a length of the period for SSB measurement and/or a time domain position of the period for SSB measurement.

The serving cell may send the updated period configuration to the terminal in a way of broadcast, multicast or unicast after the period configuration is updated. Exemplarily, the serving cell may send the period configuration to the terminal via a RRC signaling.

In an embodiment of the disclosure, the period for SSB measurement may be classified into two types, in which one is the SMTC window, and the other is the measurement gap.

For the SMTC window, the terminal may perform the SSB measurement on the neighboring cell within the SMTC window when a same frequency band is used by the serving cell and the neighboring cell, that is, the serving cell and the neighboring cell are intra-frequency cells for each other. The terminal may also need to change an antenna parameter when performing the SSB measurement on the neighboring cell in a case that the serving cell and the neighboring cell are inter-frequency cells for each other, so the period for SSB measurement in this case includes a measurement gap longer than a duration of the SMTC window and a corresponding SMTC window. The terminal performs the SSB measurement on the neighboring cell within the SMTC window included in the measurement gap in a case that the serving cell and the neighboring cell are inter-frequency cells for each other. In an inter-frequency system, the measurement gap may include one or more SMTC windows.

In a word, in embodiments of the disclosure, the update indication information is reported based on the detection result of the SSB of the neighboring cell, and the network side is triggered to perform necessary update on the period for SSB measurement, thus reducing unnecessary update of the period for SSB measurement, reducing signaling overhead caused by frequently updating the period for SSB measurement, and also reducing occurrence of failure of the SSB detection of the neighboring cell or resource waste caused by a too long or short fixed length of the period for SSB measurement.

Meanwhile, updating the period for SSB measurement involves an interaction between the terminal and the base station. Therefore, the update of the period for SSB measurement is not a one-way update, thus reducing occurrence of a situation where a period for SSB measurement generated through an update of the period for SSB measurement performed by the terminal itself is not suitable for a current communication scene. Therefore, the method for updating the period for SSB measurement according to embodiments of the disclosure has a characteristic of a low signaling overhead and a characteristic that the setting of the period for SSB measurement meets the SSB measurement requirement of the current neighboring cell.

In some embodiments, the action at S120 may include:

reporting the update indication information in response to determining that the SSB detection for at least one neighboring cell fails based on the detection result of the SSB.

The SSB detection for at least one neighboring cell failing may be understood as follows: the SSB emitted by the at least one neighboring cell is not detected by the terminal, there may be an improper setting of the current period for SSB measurement. In order to successfully detect the SSB of the neighboring cell, the terminal may report the update indication information based on the detection result, to trigger the network side (including but not limited to the serving cell) to update the period configuration of the period for SSB measurement, and then the terminal may re-determine the period for SSB measurement based on the updated period configuration of the period for SSB measurement. There is a great probability that the SSB of each neighboring cell that needs to be detected may be successfully detected when the SSB of the neighboring cell is measured within the updated period for SSB measurement.

Exemplarily, when the update indication information carries the second transmission delay difference, the action at S120 may include: determining that the SSB detection for at least one neighboring cell fails based on the detection result.

In an embodiment, the method also includes:

not reporting the update indication information, that is, stopping or blocking the reporting of the update indication information, in response to determining that the terminal detects the SSBs of all the neighboring cells successfully based on the detection result of the SSB. In this way, an unnecessary signaling overhead is reduced.

In an embodiment, as illustrated in FIG. 4, the action at S120 may include the followings.

S121: in response to the period configuration being not an initial period configuration, at least the first transmission delay difference between the transmission delay from the terminal to the serving cell and the transmission delay from the terminal to the neighboring cell for which the SSB detection fails is determined based on the detection result of the SSB.

S122: the update indication information is reported based on the first transmission delay difference.

The initial period configuration may be a first period configuration for determining the period for SSB measurement sent by the network side to the terminal.

Exemplarily, the period configuration may be classified into the initial period configuration and a non-initial period configuration based on the first period configuration of the period for SSB measurement received by the terminal when entering the current serving cell. The initial period configuration is the first period configuration of the period for SSB measurement obtained by the terminal after entering the serving cell. Period configurations after the first period configuration are all the non-initial period configurations.

Exemplarily, the initial period configuration may be a period configuration broadcasted by the serving cell.

In a case that after the terminal enters the serving cell, the currently used period configuration of the period for SSB measurement is not the initial period configuration, it means that the terminal already knows the neighboring cells of the service cell.

In a case that a current base station stores each transmission delay difference for determining a currently used period for SSB measurement, the transmission delay difference (i.e. the first transmission delay difference) between the transmission delay from the neighboring cell for which the SSB detection fails to the terminal and the transmission delay from the serving cell to the terminal is reported to the base station. The base station may update the period for SSB measurement based on the previously stored transmission delay difference between the transmission delays from the terminal respectively to the serving cell and the neighboring cell and the first transmission delay difference currently reported.

The transmission delay difference here may be one of:
a difference obtained by subtracting the transmission delay between the terminal and the serving cell from the transmission delay between the terminal and the neighboring cell; and
a difference obtained by subtracting the transmission delay between the terminal and the neighboring cell from the transmission delay between the terminal and the serving cell;

In an embodiment, the update indication information may be any information that directly or indirectly indicates the neighboring cell for which the SSB detection fails without carrying the cell identification of the neighboring cell. Of course, this is merely an example of the update indication information, and a detailed implementation is not limited to the example.

In an embodiment, the action at S120 may directly include: at least determining the first transmission delay difference between the transmission delay from the terminal to the serving cell and the transmission delay from the terminal to the neighboring cell for which the SSB detection fails based on the detection result of the SSB, and reporting the update indication information based on the first transmission delay difference.

For example, a cell list of neighboring cells of the serving cell is sent synchronously with the initial period configuration. In this case, the terminal receives the initial period configuration after entering the serving cell, and may also determine the neighboring cells for which the SSB detection fails.

That is, in some cases, the terminal does not need to determine whether the currently used period configuration is the initial period configuration.

In an embodiment, the method also includes:
determining that the detection result of the SSB of the corresponding neighboring cell indicates a failure in response to the SSB detection for the same neighboring cell failing within M consecutive periods for SSB measurement. M represents an arbitrary positive integer.

In embodiments of the disclosure, in order to ensure an accuracy of the detection result, the terminal does not determine that the SSB detection for the neighboring cell fails when the SSB detection for the neighboring cell fails merely once, but determines that the SSB detection for the neighboring cell fails after the SSB detection fails for M consecutive times.

Of course, in another embodiment, the terminal may determine that the SSB detection for the corresponding neighboring cell fails when determining that the SSB detection fails in one detection process for the neighboring cell.

In an embodiment, the method also includes:
determining that the SSB detection fails once in response to not successfully detecting N SSBs of the neighboring cell when performing the SSB measurement for the neighboring cell within one period for SSB measurement; and/or, determining that the SSB detection succeeds once in response to successfully detecting the N SSBs of the neighboring cell when performing the SSB measurement for the neighboring cell within one period for SSB measurement.

N is less than or equal to a total number of SSBs configured for the corresponding neighboring cell within one period for SSB measurement.

One SSB detection for the neighboring cell is the SSB detection within one period for SSB measurement, detecting each SSB in an SSB set (SSB burst or SSB burst set). The SSB set includes: one or more SSBs.

In a case that N SSBs are successfully detected when the measurement is performed once, it may be considered that the measurement is successful this time. N may be less than the total number of SSBs configured in the SSB set.

The above way is equivalent to further making the detection result of the SSB of the neighboring cell accurate.

In an embodiment, the action at S121 may include:
reporting the update indication information based on the period configuration and the first transmission delay difference.

There are different types of period configurations of the period for SSB measurement. The different types of period configurations may be classified into period configurations with different granularities based on an application scope.

A public period configuration is aimed at all the neighboring cells of the serving cell.

A group period configuration is aimed at one neighboring cell group of the serving cell. One neighboring cell group includes one or more neighboring cells.

A cell period configuration is aimed at a single neighboring cell of the serving cell.

The update indication information may contain different information contents due to the different types of period configurations. The base station may quickly and pertinently update the period for SSB measurement of the neighboring cell based on differentiation of the information contents of the update indication information after receiving the update indication information.

In an embodiment, reporting the update indication information based on the period configuration and the first transmission delay difference includes at least one of:
reporting update indication information indicating a first range of delay differences based on the first transmission delay difference in response to the period configuration being the public period configuration, in which a period for SSB measurement determined by the public period configuration is used for SSB measurement of all neighboring cells of the serving cell, and the first range of delay differences is determined based on a difference between the transmission delay from the terminal to the serving cell and a transmission delay from the terminal to each of all the neighboring cells;
reporting update indication information indicating a second range of delay differences based on the first transmission delay difference in response to the period configuration being the group period configuration, in which the group period configuration is configured to determine a period for SSB measurement shared by all neighboring cells in a neighboring cell group of the serving cell, and the second range of delay differences is determined based on a difference between the transmission delay from the terminal to the serving cell and a transmission delay from the terminal to each neighboring cell in the neighboring cell group where a neighboring cell for which the SSB detection fails is located; and reporting update indication information indicating the first transmission delay difference based on the first transmission delay difference in response to the period configuration being the cell period configuration, in which the cell period configuration is configured to determine a period for SSB measurement of one neighboring cell of the serving cell.

In a case that the current period for SSB measurement is determined based on the public period configuration, the transmission delay differences corresponding to all the neighboring cells of the serving cell are determined while the first transmission delay difference is determined, and the range of the transmission delay differences corresponding to all the neighboring cells is reported in the entire update indication information.

For example, the first transmission delay difference is P1, the transmission delays of other neighboring cells are represented by px, and x is any positive integer indicating the neighboring cell. The update indication information may carry max(p1, px) and min(p1, px). Exemplarily, the first range of delay differences may be indicated by the max(p1, px) and the min(p1, px).

In a case that the current period for SSB measurement is determined based on the group period configuration, the transmission delay differences corresponding to neighboring cells other than the neighboring cell for which the SSB detection fails in the neighboring cell group where neighboring cell for which the SSB detection fails is located are also determined while the first transmission delay difference is determined. The transmission delay difference corresponding to the neighboring cell is: the transmission delay difference between the transmission delays from the terminal respectively to the serving cell and the neighboring cell.

For example, the first transmission delay difference is P1, the transmission delays of other neighboring cells in the neighboring cell group are represented by py, and y is any positive integer indicating any of the neighboring cells other than the neighboring cell for which the SSB detection fails in the neighboring cell group. The update indication information may carry max(p1, py) and min(p1, py). Exemplarily, the first range of delay differences may be indicated by the max(p1, py) and the min(p1, py). In a case that the current period for SSB measurement is determined based on the cell period configuration, the update indication information may directly carry the first transmission delay difference and directly or indirectly carry information indicating the neighboring cell for which the SSB detection fails after determining the first transmission delay difference.

In an embodiment, reporting the update indication information based on the detection result of the SSB includes:

in response to the period configuration being the initial period configuration, determining the second transmission delay difference between the transmission delay from the terminal to the serving cell and the transmission delay from the terminal to a neighboring cell for which the SSB detection succeeds based on the detection result of the SSB; and reporting the update indication information based on the second transmission delay difference.

The terminal has not established a connection with the serving cell and cannot receive a unicast list of neighboring cells in a case that the current period for the terminal to measure the SSB of the neighboring cell is determined based on the initial period configuration. In this case, the terminal may report the transmission delay differences corresponding to all the neighboring cells for which the SSB detection succeeds to the serving cell, such that the base station of the serving cell determines whether miss-detection of the SSBs of one or more neighboring cells occurs in the terminal, and further determines whether there is a need to update the period for SSB measurement.

The difference between the transmission delay from the terminal to the serving cell and the transmission delay from the terminal to the corresponding neighboring cell is determined based on a position of the terminal, ephemeris information of the serving cell and ephemeris information of the corresponding neighboring cell.

In an embodiment, the ephemeris information of the serving cell is configured to determine a position of a serving satellite of the serving cell, and the ephemeris information of the neighboring cell is configured to determine a position of a neighboring cell satellite of the neighboring cell.

In an embodiment, the method also includes: receiving the ephemeris information of the serving cell and the ephemeris information of the neighboring cell sent by the serving cell.

For example, the ephemeris information may be broadcast, multicast or unicast by the serving cell. In this way, the terminal may receive the ephemeris information of the serving cell and/or the ephemeris information of the neighboring cell on a broadcast channel, a multicast channel or a unicast channel.

When the terminal determines the transmission delays from the terminal to the serving cell and the neighboring cell respectively, the terminal may determine a distance between the position of the terminal and the position of the serving satellite of the serving cell, and determine the transmission delay based on the distance and a transmission rate of the wireless signal. Then, the transmission delay difference such as the first transmission delay difference and/or the second transmission delay difference is obtained based on the difference between the transmission delay corresponding to the serving cell and the transmission delay corresponding to the neighboring cell. In an embodiment, the transmission rate of the wireless signal may be approximately equal to the speed of light.

In another embodiment, the terminal may query a preset correspondence between the distance and the transmission delay after determining the distance, so as to simply determine the transmission delays from the terminal to the serving cell and the neighboring cell respectively.

In some embodiments, a transmission delay of a feeder link between a communication gateway (GW) and the serving cell and a transmission delay of a feeder link between the GW and the neighboring cell are automatically compensated by the serving cell before the period for SSB measurement is updated, such that the most suitable period for SSB measurement of the neighboring cell may be obtained by updating.

In an embodiment, one neighboring cell corresponds to one frequency point or one carrier.

Figure 5:
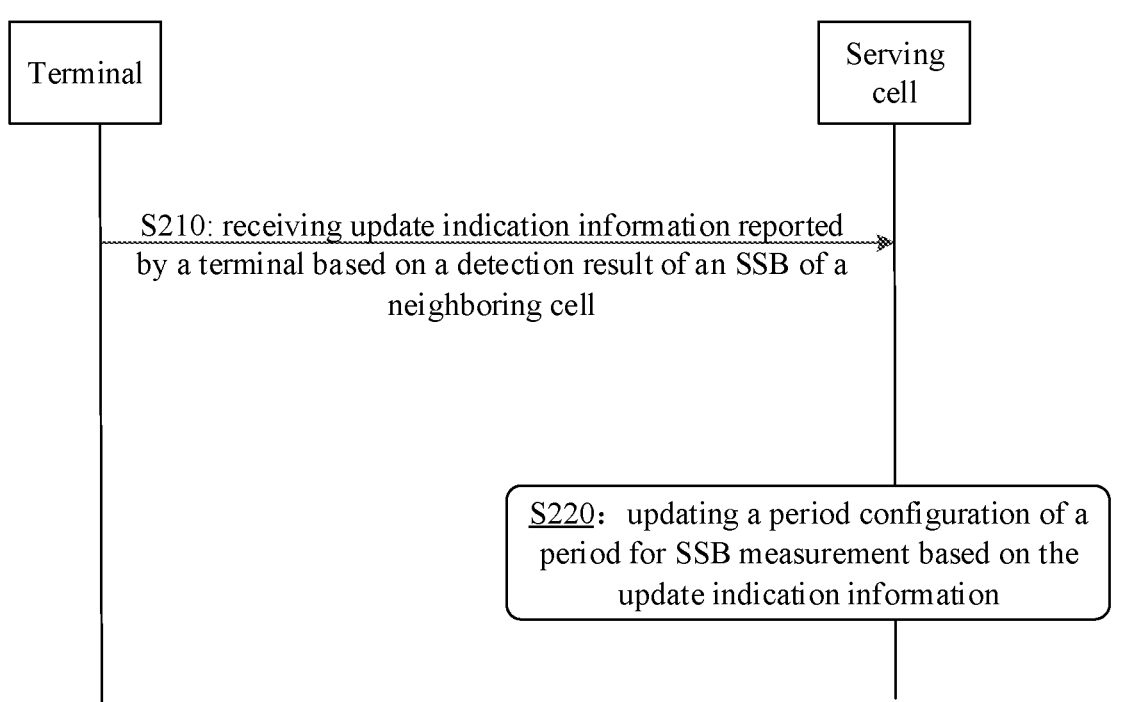
FIG. 5 is a flow chart illustrating a method for configuring a period for SSB measurement according to an exemplary embodiment.

As illustrated in FIG. 5, embodiments of the disclosure provide a method for configuring a period for SSB measurement, which is applied to a serving cell. The method includes the following.

S210: update indication information reported by a terminal based on a detection result of an SSB of a neighboring cell is received.

S220: a period configuration of a period for SSB measurement is updated based on the update indication information. The period configuration includes indication information for determining the period for SSB measurement.

The method for updating the period for SSB measurement may be applied to the serving cell. In this case, an execution subject of the actions from S210 to S220 may be a serving satellite of the serving cell.

The serving satellite includes, but is not limited to, a geostationary earth orbiting (GEO) satellite and/or a low earth orbiting (LEO) satellite.

The update indication information reported by the terminal is received. The period during which the terminal performs the SSB measurement on the neighboring cell is updated based on the update indication information.

A new period configuration may be generated in a case that the base station updates the period for SSB measurement. The network side may send the new period configuration to the terminal for use after generating the new period configuration.

The network side updates the period configuration through the update indication information reported based on the detection result of the SSB of the neighboring cell. This way has the characteristics of dynamically and flexibly adjusting the period for SSB measurement, and also has a characteristic of a low signaling overhead.

For example, in an embodiment, the update indication information is reported when the terminal determines that SSB detection for at least one neighboring cell fails based on the detection result of the SSB.

Related descriptions of the information contents of the update indication information may refer to corresponding embodiments mentioned above, which is not be repeated herein.

The update indication information may or may not carry a transmission delay difference.

Exemplarily, the action at S220 may include: updating the period configuration of the period for SSB measurement based on the transmission delay difference carried by the update indication information.

The transmission delay difference carried by the update indication information here may include: at least one of the first transmission delay difference and the second transmission delay difference in the above embodiments at the terminal side.

In an embodiment, the action at S220 may include:

based on the first transmission delay difference carried by the update indication information, updating the period configuration of the period for SSB measurement of the neighboring cell corresponding to the first transmission delay difference according to a type of a period configuration corresponding to the first transmission delay difference; in which the first transmission delay difference is a difference between a transmission delay from the terminal to the serving cell and a transmission delay from the terminal to each neighboring cell in a neighboring cell group where a neighboring cell for which the SSB detection fails is located.

In embodiments of the disclosure, in order to reduce unnecessary update of a period configuration on one hand and to reduce occurrence of a phenomenon of a high signaling overhead caused by sending the period configurations obtained by all updates, merely the period configuration associated with the neighboring cell for which the SSB detection fails is updated.

The type of the period configuration includes at least one of:

a public period configuration aimed at all neighboring cells of the serving cell;

a group period configuration aimed at one neighboring cell group of the serving cell, in which, one neighboring cell group includes one or more neighboring cells; or a cell period configuration aimed at a single neighboring cell of the serving cell.

In an embodiment, updating the period configuration of the period for SSB measurement of the neighboring cell corresponding to the first transmission delay difference based on the type of the period configuration corresponding to the first transmission delay difference includes at least one of:

updating the public period configuration in response to the period configuration corresponding to the first transmission delay difference being the public period configuration, in which the public period configuration is configured to determine a period for SSB measurement shared by all the neighboring cells of the serving cell;

updating the group period configuration in response to the period configuration corresponding to the first transmission delay difference being the group period configuration, in which the group period configuration is configured to determine a period for SSB measurement shared by all the neighboring cells in the neighboring cell group of the serving cell; and updating the cell period configuration in response to the period configuration corresponding to the first transmission delay difference being the cell period configuration, in which the cell period configuration is configured to determine a period for SSB measurement of one neighboring cell of the serving cell.

In an embodiment, updating the period configuration of the period for SSB measurement based on the update indication information includes:

determining a reference value based on the update indication information; and updating the period configuration based on the reference value and preset information for adjusting the reference value.

Since there are multiple types of satellites of the NTN cell provided in the NTN system, different satellites have different trajectories. A velocity of the terminal may affect the SSB measurement of the neighboring cell.

Therefore, in embodiments of the disclosure, in order to provide the most suitable period configuration of the period for SSB measurement, the preset information is introduced to correct the reference value determined based on the update indication information.

In an embodiment, the preset information includes at least one of:

a type of a serving satellite of the serving cell;

a type of a neighboring cell satellite of the neighboring cell;

ephemeris information of the serving satellite of the serving cell;

ephemeris information of the neighboring cell satellite of the neighboring cell; and a moving velocity of the terminal.

The ephemeris information of the neighboring cell satellite and/or the serving satellite may be respectively configured to locate the position of the neighboring cell satellite and the position of the serving satellite. For example, the moving velocity of the terminal may be embodied by a detailed velocity value, or embodied by a velocity level of the moving velocity of the terminal.

In an embodiment, the method also includes:

determining an initial period configuration of the period for SSB measurement based on a default range of transmission delay differences.

Exemplarily, the default range of transmission delay differences includes at least one of:

a range from a first minimum value to a first maximum value, in which the first minimum value is a minimum value of differences obtained by subtracting transmission delays between any position in the serving cell and all neighboring cells from a transmission delay between the any position in the serving cell and the serving cell, and the first maximum value is a maximum value of the differences obtained by subtracting the transmission delays between any position in the serving cell and all neighboring cells from the transmission delay between the any position in the serving cell and the serving cell;

a range from a second minimum value to a second maximum value, in which the second minimum value is a minimum value of differences obtained by subtracting a transmission delay between any position in the serving cell and the serving cell from transmission delays between the any position in the serving cell and all neighboring cells, and the second maximum value is a maximum value of the differences obtained by subtracting the transmission delay between any position in the serving cell and the serving cell from the transmission delays between the any position in the serving cell and all neighboring cells;

a maximum range of transmission delay differences reported by the terminal accessing the serving cell; or a range of transmission delay differences determined based on historical data.

Exemplarily, a coverage range of the serving cell includes two positions, i.e., position A and position B, two neighboring cells and two neighboring cell satellites corresponding to the two neighboring cells. A transmission delay from the position A to an SA (serving satellite) is 10, a transmission delay from the position A to an NA1 (neighboring cell satellite 1) is 132, a transmission delay from the position A to an NA2 (neighboring cell satellite 2) is 9, a transmission delay from the position B to the SA (serving satellite) is 110, a transmission delay from the position B to the NA1 (neighboring cell satellite 1) is 22, and a transmission delay from the position B to the NA2 (neighboring cell satellite 2) is 10.

In a case that the range from the first minimum value to the first maximum value is used, the range of transmission delay differences is [−122,100], where −122 is the first minimum value, and 100 is the first maximum value. In a case that the range from the second minimum value to the second maximum value is used, the range of transmission delay differences is [−100,122], where −100 is the second minimum value and 122 is the second maximum value.

In an embodiment, the serving cell currently accessed by the terminal has been accessed by other terminals, and the other terminals may also report a range of transmission delay differences determined based on the transmission delay differences to the serving cell. In embodiments of the disclosure, the initial period configuration for one terminal accessing the serving cell may be determined for the terminal based on a maximum range of transmission delay differences reported by the other terminals. In this way, there is a characteristic of simple implementation.

In an embodiment, the historical data may be the period configuration used by the current terminal and/or other terminals at a historical time moment, and a period configuration for a current terminal is determined by the serving cell based on the range of transmission delay differences adopted in the period configuration used by the current terminal and/or other terminals at a historical time moment.

In short, there are multiple ways for determining the default range, and the detailed implementation is not limited to any of the above.

In another embodiment, updating the period configuration of the period for SSB measurement based on the update indication information includes:

updating the period configuration based on a second transmission delay difference corresponding to an initial period configuration and carried by the update indication information. The second transmission delay difference is a difference between the transmission delay from the terminal to the serving cell and a transmission delay from the terminal to each neighboring cell in a neighboring cell group where a neighboring cell for which the SSB detection succeeds is located.

In an embodiment, the method also includes: sending ephemeris information. The ephemeris information includes ephemeris information of the serving satellite of the serving cell and/or ephemeris information of the neighboring cell satellite of the neighboring cell.

The sent ephemeris information may be configured to determine the above mentioned first transmission delay difference and/or second transmission delay difference.

The ephemeris information may be sent in a way of broadcast, multicast or unicast.

Embodiments of the disclosure provide a following enhancement solution of the SMTC window/measurement gap suitable for the NTN system. In embodiments of the disclosure, a compromise is made between resources occupied by the SMTC window/measurement gap and an update frequency, such that an impact of the SMTC window/measurement gap on data transmission and reception may be reduced merely by updating a configuration of the UE with less RRC signaling.

The technical solution in embodiments of the disclosure may be described as follows.

The UE performs the SSB measurement on the neighboring cell based on a received configuration of SMTC window/measurement gap. When the UE determines that the SSB of a certain neighboring cell may not be detected by an existing configuration of the SMTC window/measurement gap, the UE reports an indication indicating that the SSB of the neighboring cell may not be detected (the indication may include an identification (ID) of the neighboring cell), updates the transmission delay difference, and reports the transmission delay difference to the network via a RRC message.

The UE needs to update the range of transmission delay differences related to the serving cell and all neighboring cells to be measured in a case that the network configures a public SMTC window/measurement gap for all the neighboring cells to be measured.

The UE merely needs to update the transmission delay difference between the serving cell and the neighboring cell for which the SSB detection fails in a case that the network configures different SMTC windows/measurement gaps for each neighboring cell to be measured.

The UE merely needs to update the range of transmission delay differences related to the serving cell and each neighboring cell to be detected in the neighboring cell group where the neighboring cell for which the SSB detection failed is located in a case that the network configures different SMTC windows/measurement gaps for each neighboring cell group to be measured.

The network configures or updates the SMTC window/measurement gap based on the transmission delay difference.

Exemplarily, the network configures or updates the public SMTC window/measurement gap based on the range of transmission delay differences.

Exemplarily, the network configures or updates the SMTC window/measurement gap of the neighboring cell based on the transmission delay difference corresponding to the neighboring cell.

Exemplarily, the network configures or updates the SMTC window/measurement gap of the neighboring cell group to be measured based on the range of transmission delay differences corresponding to the neighboring cell group.

Exemplarily, the network may determine an offset value based on a type of the satellite (LEO/GEO/MEO), a trajectory of the satellite and the moving velocity of the UE (low velocity, medium velocity and high velocity), and adjust or expand a configuration of the SMTC window/measurement gap. Here, the offset value may be determined based on the preset information mentioned above. After the reference value is determined based on the transmission delay difference or the range of transmission delay differences, the reference value is corrected based on the offset value to obtain a final value of the SMTC window/measurement gap, thereby generating a new configuration of the SMTC window and/or measurement gap. Each of the configuration of the SMTC window and the configuration of the measurement gap here is one of the above-mentioned period configurations.

Exemplarily, the network may update the corresponding SMTC window/measurement gap merely after receiving the indication indicating that the SSB of a certain neighboring cell may not be detected and the corresponding update information of the transmission delay difference reported by the UE.

An initial configuration of the SMTC window/measurement gap is configured by the network based on information of the maximum transmission delay difference in the cell. The initial configuration of the SMTC window/measurement gap may correspond to the initial period configuration aforementioned.

The UE reports information of a transmission delay difference corresponding to the satellite based on the first one of neighboring cells for which the SSB may be detected, and the network updates the configuration of the SMTC window/measurement gap based on the information accordingly.

Exemplarily, the UE may store a list of neighboring cells where the SSB is detected after the previous N updates for the configuration of the SMTC window/measurement gap, and the list of neighboring cells is configured to determine a condition where the SSBs of neighboring cells in the list may not be detected based on a latest configuration of the SMTC window/measurement gap.

Exemplarily, a counter X is defined. It is determined that the UE may not detect the SSB of a certain neighboring cell based on the existing configuration of the SMTC window/measurement gap in a case that the number of X corresponding to the neighboring cell is greater than a specified number. The condition where the SSB is not detected is a specific embodiment of the SSB detection failure above-mentioned. The specified number here includes, but is not limited to, M mentioned in the above embodiments.

Exemplarily, when the UE may not detect the SSB of a certain neighboring cell within a certain SMTC/gap measurement gap, X is added by 1. When the UE detects the SSB of a certain neighboring cell within a certain SMTC/gap measurement gap, X is cleared.

Exemplarily, the US detecting the SSB of a certain neighboring cell detected within a certain SMTC/gap measurement gap includes:

the SMTC/gap measurement gap capable of containing all SSB signals; and the SMTC window/gap measurement gap capable of containing at least n SSB signals, where n is not less than 1.

Exemplarily, the UE calculates the transmission delay difference between the transmission delays from the UE to the serving cell and the neighboring cell based on the position of the UE, and the ephemeris information of the serving cell satellite and the ephemeris information of the neighboring cell satellite.

Exemplarily, the UE may obtain the position of the satellite based on the ephemeris information, then calculate a distance between the UE and the satellite, divide the distance by the speed of light to obtain the transmission delay of the UE in the cell covered by the satellite, and subtract the transmission delay corresponding to the neighboring cell from the transmission delay corresponding to the serving cell to obtain the transmission delay difference. A value range of the transmission delay difference includes a real number.

The transmission delay difference between a feeder link of the serving cell and a feeder link of the neighboring cell may be compensated at a network site, and the UE merely needs to calculate a transmission delay difference of a serving link.

Exemplarily, obtaining, by the UE, the ephemeris information of the satellites respectively corresponding to the serving cell and the neighboring cells includes the following.

The network directly provides the UE with the ephemeris information of the satellites respectively corresponding to the serving cell and the neighboring cell.

The UE obtains the identifications of the satellites respectively corresponding to the serving cell where the UE is located and the neighboring cell via the network, and then obtains the ephemeris information of the satellites based on pre-configuration information of the UE.

The neighboring cell in embodiments of the disclosure may be a certain frequency point or a certain cell.

Figure 6:
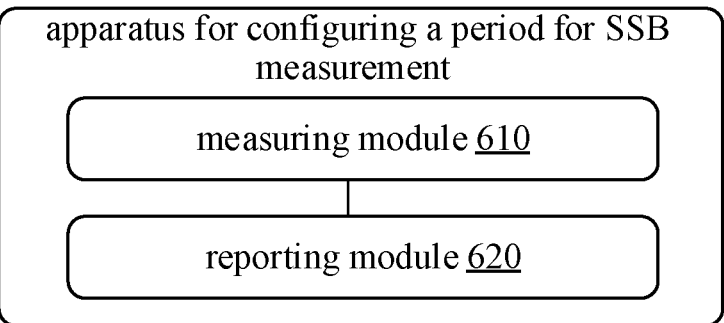
FIG. 6 is a block diagram illustrating an apparatus for configuring a period for SSB measurement according to an exemplary embodiment.

As illustrated in FIG. 6, embodiments of the disclosure provide an apparatus for configuring a period for SSB measurement, applied to a terminal. The apparatus includes a measuring module 610 and a reporting module 620.

The measuring module 610 is configured to detect an SSB of a neighboring cell within the period for SSB measurement, in which the period for SSB measurement includes: an SMTC window and/or a measurement gap.

The reporting module 620 is configured to report update indication information based on a detection result of the SSB, in which the update indication information is configured to update a period configuration at a network side, and the period configuration includes indication information for determining the period for SSB measurement.

In an embodiment, the measuring module 610 and the reporting module 620 may be program modules. The program modules may implement the SSB measurement of the neighboring cell, and report the update indication information based on the detection result obtained from the SSB measurement after the program modules are executed by the processor.

In another embodiment, the measuring module 610 and the reporting module 620 may be software and hardware combined modules. The software and hardware combined module includes, but is not limited to, a programmable array. The programmable array includes, but is not limited to, a complex programmable array and/or a field programmable array.

In a yet embodiment, the measuring module 610 and the reporting module 620 may be pure hardware modules. The pure hardware module includes, but is not limited to, an application specific integrated circuit.

In an embodiment, the reporting module 620 is configured to report the update indication information in response to determining that SSB detection for at least one neighboring cell fails based on the detection result of the SSB.

In an embodiment, the reporting module 620 is configured to: at least determine a first transmission delay difference between the transmission delay from the terminal to the serving cell and a transmission delay from the terminal to a neighboring cell for which the SSB detection fails based on the detection result of the SSB in response to the period configuration being not an initial period configuration, and report the update indication information based on the first transmission delay difference.

In an embodiment, the reporting module 620 is configured to determine a transmission delay difference between the transmission delay from the terminal to the serving cell and a transmission delay from the terminal to the neighboring cell based on the detection result of the SSB; and report the update indication information based on the transmission delay difference.

In an embodiment, the apparatus also includes:

a first determining module, configured to determine that the detection result of the SSB corresponding to the neighboring cell is indicates a failure in response to the SSB detection for the same neighboring cell failing within M consecutive periods for SSB measurement, where M represents an arbitrary positive integer.

In an embodiment, the apparatus also includes:

a second determining module, configured to determine that the SSB detection fails once in response to not successfully detecting N SSBs of the neighboring cell when performing the SSB measurement for the neighboring cell within one period for SSB measurement; and/or determine that the SSB detection succeeds once in response to successfully detecting the N SSBs of the neighboring cell when performing the SSB measurement for the neighboring cell within one period for SSB measurement, where N is less than or equal to a total number of SSBs configured for the corresponding neighboring cell within one period for SSB measurement.

In an embodiment, the reporting module 620 is configured to report the update indication information based on the period configuration of the period for SSB measurement and the first transmission delay difference.

In an embodiment, the reporting module 620 is configured to perform at least one of:

reporting update indication information indicating a first range of delay differences based on the first transmission delay difference in response to the period configuration being a public period configuration, in which a period for SSB measurement determined by the public period configuration is used for SSB measurement of all neighboring cells of the serving cell, and the first range of delay differences is determined based on a difference between the transmission delay from the terminal to the serving cell and a transmission delay from the terminal to each of all the neighboring cells;

reporting update indication information indicating a second range of delay differences based on the first transmission delay difference in response to the period configuration being a group period configuration, in which the group period configuration is configured to determine a period for SSB measurement shared by all neighboring cells in a neighboring cell group of the serving cell, and the second range of delay differences is determined based on a difference between the transmission delay from the terminal to the serving cell and a transmission delay from the terminal to each neighboring cell in the neighboring cell group where a neighboring cell for which the SSB detection fails is located; and reporting update indication information indicating the first transmission delay difference based on the first transmission delay difference in response to the period configuration being a cell period configuration, in which the cell period configuration is configured to determine a period for SSB measurement of one neighboring cell of the serving cell.

In an embodiment, the reporting module 620 is also configured to: determine a second transmission delay difference between the transmission delay from the terminal to the serving cell and a transmission delay from the terminal to a neighboring cell for which the SSB detection succeeds based on the detection result of the SSB in response to the period configuration being the initial period configuration, and report the update indication information based on the second transmission delay difference.

In an embodiment, the difference between the transmission delay from the terminal to the serving cell and the transmission delay from the terminal to a corresponding neighboring cell is determined based on a position of the terminal, ephemeris information of the serving cell and ephemeris information of the corresponding neighboring cell.

In an embodiment, the ephemeris information of the serving cell is configured to determine a position of a serving satellite of the serving cell; and the ephemeris information of the neighboring cell is configured to determine a position of a neighboring cell satellite of the neighboring cell.

In an embodiment, the apparatus also includes:

a first receiving module, configured to receive the ephemeris information of the serving cell and the ephemeris information of the neighboring cell sent by the serving cell.

Figure 7:
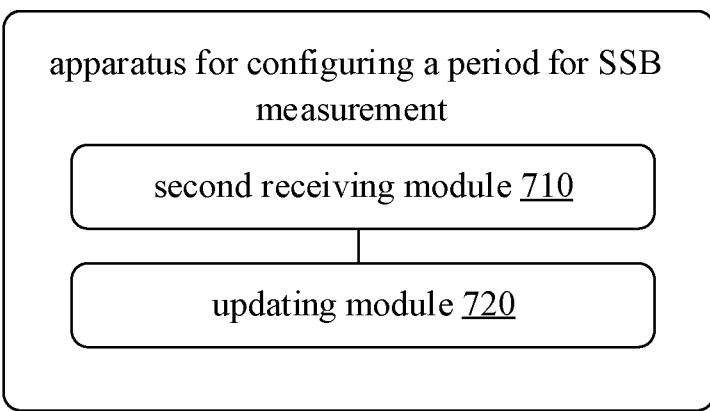
FIG. 7 is a block diagram illustrating an apparatus for configuring a period for SSB measurement according to an exemplary embodiment.

As illustrated in FIG. 7, embodiments of the disclosure provide an apparatus for configuring a period for SSB measurement, applied to a serving cell. The apparatus includes: a second receiving module 710 and an updating module 720.

The second receiving module 710 is configured to receive update indication information reported by a terminal based on a detection result of an SSB of a neighboring cell.

The updating module 720 is configured to update a period configuration of the period for SSB measurement based on the update indication information. The period configuration includes indication information for determining the period for SSB measurement.

In an embodiment, the second receiving module 710 and the updating module 720 may be program modules. The program modules may implement receiving the update indication information reported by the terminal and updating the period configuration after the program modules are executed by the processor.

In another embodiment, the second receiving module 710 and the updating module 720 may be software and hardware combined modules. The software and hardware combined module includes, but is not limited to, a programmable array. The programmable array includes, but is not limited to, a complex programmable array and/or a field programmable array.

In a yet embodiment, the second receiving module 710 and the updating module 720 may be pure hardware modules. The pure hardware module includes, but is not limited to, an application specific integrated circuit.

In an embodiment, the updating module 720 is configured to update the period configuration of the period for SSB measurement based on a transmission delay difference carried by the update indication information.

In an embodiment, the updating module 720 is configured to, based on a first transmission delay difference carried by the update indication information, update a period configuration of a period for SSB measurement of a neighboring cell corresponding to the first transmission delay difference according to a type of the period configuration corresponding to the first transmission delay difference. The first transmission delay difference is a difference between a transmission delay from the terminal to the serving cell and a transmission delay from the terminal to each neighboring cells in a neighboring cell group where a neighboring cell for which SSB detection fails is located.

In an embodiment, the updating module 720 is configured to perform at least one of:

updating a public period configuration in response to the period configuration corresponding to the first transmission delay difference being the public period configuration, in which the public period configuration is configured to determine a period for SSB measurement shared by all neighboring cells of the serving cell;

updating a group period configuration in response to the period configuration corresponding to the first transmission delay difference being the group period configuration, in which the group period configuration is configured to determine a period for SSB measurement shared by all neighboring cells in a neighboring cell group of the serving cell; and updating a cell period configuration in response to the period configuration corresponding to the first transmission delay difference being the cell period configuration, in which the cell period configuration is configured to determine a period for SSB measurement of one neighboring cell of the serving cell.

In an embodiment, the updating module 720 is configured to determine a reference value based on the update indication information; and update the period configuration based on the reference value and preset information for adjusting the reference value.

In an embodiment, the preset information includes at least one of:

a type of a serving satellite of the serving cell;

a type of a neighboring cell satellite of the neighboring cell;

ephemeris information of the serving satellite of the serving cell;

ephemeris information of the neighboring cell satellite of the neighboring cell; and a moving velocity of the terminal.

In an embodiment, the apparatus also includes:

a third determining module, configured to determine an initial period configuration of the period for SSB measurement based on a default range of transmission delay differences.

In an embodiment, the default range of transmission delay differences includes at least one of:

a range from a first minimum value to a first maximum value, in which the first minimum value is: a minimum value of differences obtained by subtracting transmission delays generated between any position in the serving cell and all neighboring cells from a transmission delay generated between the any position in the serving cell and the serving cell, and the first maximum value is a maximum value of the of differences obtained by subtracting the transmission delays between any position in the serving cell and all neighboring cells from the transmission delay between the any position in the serving cell and the serving cell;

a range from a second minimum value to a second maximum value, in which the second minimum value is a minimum value of differences obtained by subtracting a transmission delay between any position in the serving cell and the serving cell from transmission delays between the any position in the serving cell and all neighboring cells, and the second maximum value is a maximum value of the differences obtained by subtracting the transmission delay between any position in the serving cell and the serving cell from the transmission delays between the any position in the serving cell and all neighboring cells; and a maximum range of transmission delay differences reported by the terminal accessing the serving cell; and a range of transmission delay differences determined based on historical data.

In an embodiment, the updating module 720 is also configured to update the period configuration based on a second transmission delay difference corresponding to an initial period configuration and carried by the update indication information. The second transmission delay difference is a difference between the transmission delay from the terminal to the serving cell and a transmission delay from the terminal to each neighboring cell in a neighboring cell group where a neighboring cell for which the SSB detection succeeds is located.

In an embodiment, the apparatus also includes:

a sending module, configured to send ephemeris information. The ephemeris information includes ephemeris information of a serving satellite of the serving cell and/or ephemeris information of a neighboring cell satellite of the neighboring cell.

In an embodiment, updating the period configuration of the period for SSB measurement based on the update indication information includes:

updating the period configuration based on the update indication information and a transmission delay of a feeder link. The feeder link includes a transmission delay of a feeder link between a gateway and the serving cell and/or a transmission delay of a feeder link between the gateway and the neighboring cell.

Embodiments of the disclosure provide a communication device, including:

a memory, configured to store instructions executable by one or more processors; and the one or more processors, respectively coupled to the memory.

The processor is configured to execute the method for configuring a period for SSB measurement according to any one of the above technical solutions.

The processor may include various types of storage mediums. The storage medium is a non-transitory computer storage medium, which may continue to memorize information stored on the communication device after the communication device is powered off.

Here, the communication device includes a satellite or a terminal.

The processor may be coupled to the memory via a bus or the like for reading executable programs stored on the memory and implementing, such as, at least one of the methods illustrated in FIGS. 3 to 5.

Figure 8:
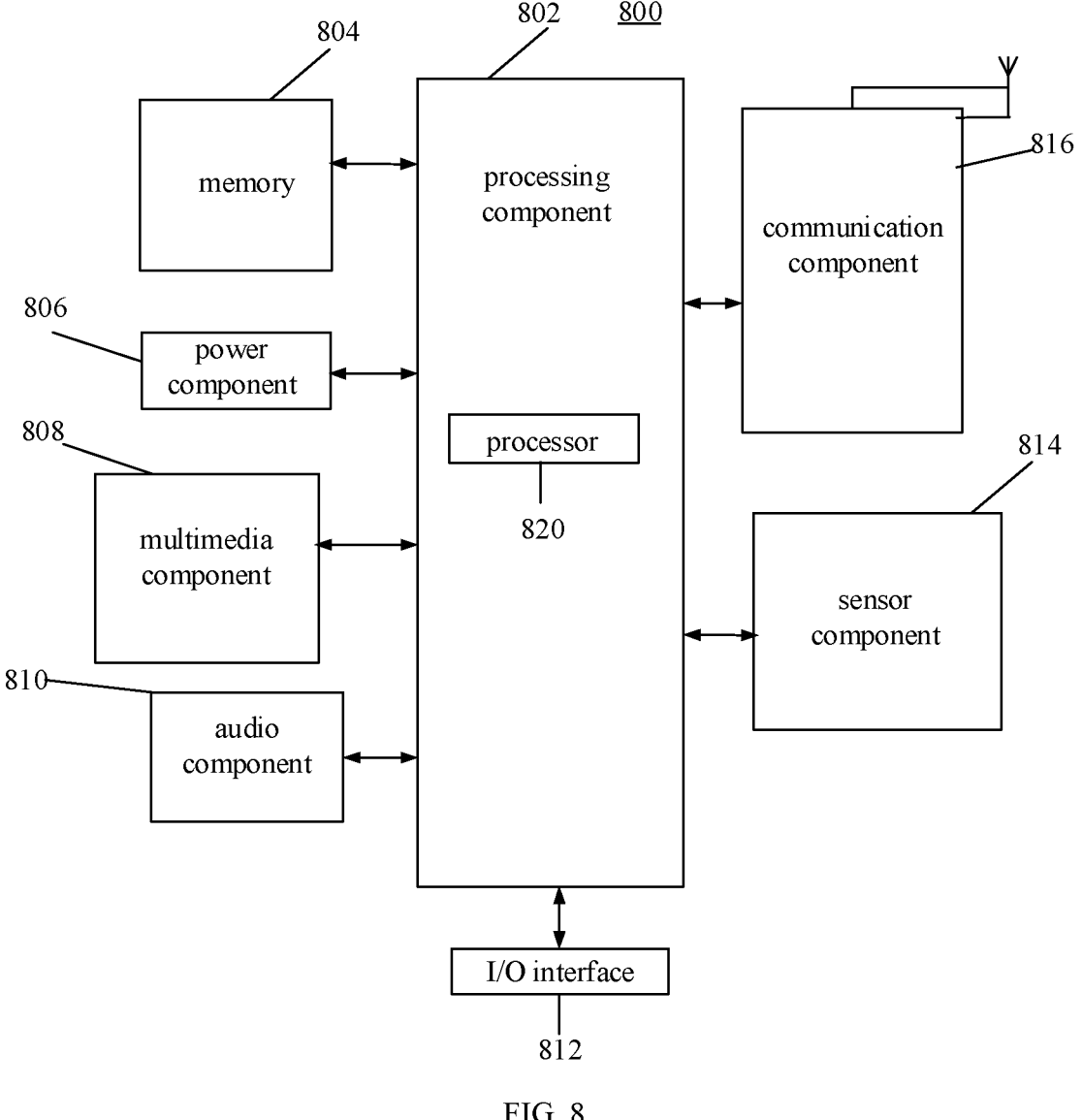
FIG. 8 is a block diagram illustrating a terminal according to an exemplary embodiment.

FIG. 8 is a block diagram illustrating a terminal 800 according to an exemplary embodiment. For example, a terminal 800 may be a mobile phone, a computer, a digital broadcast user device, a messaging sending and receiving equipment, a game console, a tablet, a medical device, a fitness device, a personal digital assistant, or the like.

As illustrated in FIG. 8, the terminal 800 may include one or more of: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 802 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800 for performing contraction data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as an adjustment mode or a video mode. Each of the front camera and the rear camera may be a fixed optical lens system or have focus and optical zoom capability.

The audio component 810 is configured to output and/or input audio signals. For example, the audio component 810 includes a microphone ("MIC") for receiving an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 is configured to provide an interface between the processing component 802 and peripheral interface modules, such as a keyboard, a click wheel, buttons, and the like. The buttons may include, but be not limited to, a home button, a volume button, a starting button, and a locking button.

The sensor component 814 includes one or more sensors for providing status assessments of various aspects of the terminal 800. For example, the sensor component 814 may detect an open/closed status of the terminal 800, relative positioning of components, e.g., the display and the keypad of the terminal 800, a change in position of the terminal 800 or a component of the terminal 800, a presence or absence of user contraction with the terminal 800, an orientation or an acceleration/deceleration of the terminal 800, and a change in temperature of the terminal 800. The sensor component 814 may include a proximity sensor for detecting the presence of nearby objects without any physical contact. The sensor component 814 may also include a light sensor, such as a CMOS (complementary metal-oxide-semiconductor)) or a CCD (charge coupled device) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 may access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, for performing the above methods.

In an exemplary embodiment, there is also provided a non-transitory computer readable storage medium including instructions, such as the memory 804 including the instructions. The instruction may be executed by the processor 820 in the terminal 800 for performing the above methods. For example, the non-transitory computer readable storage medium may be a ROM, a RAM, a CD-ROM, a magnetic tape, a floppy disc, an optical data storage device, and the like.

Figure 9:
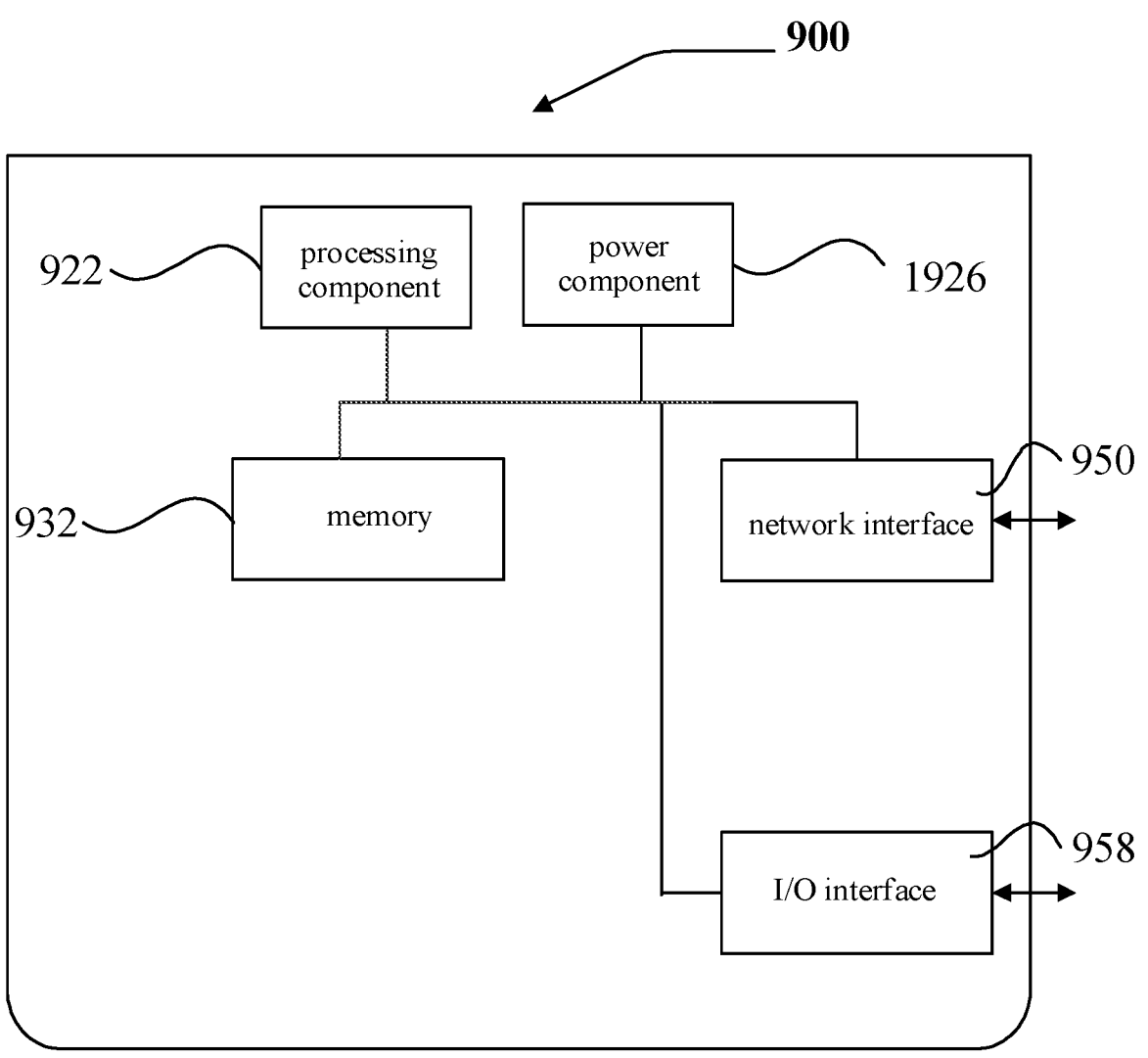
FIG. 9 is a block diagram illustrating a satellite according to an exemplary embodiment.

As illustrated in FIG. 9, an embodiment of the disclosure illustrates a structure of a satellite. For example, the satellite 900 may be provided as a network-side device. Referring to FIG. 9, the satellite 900 includes a processing component 922, further including one or more processors, and memory resources represented by a memory 932 for storing instructions, such as application programs, executable by the processing component 922. The application program stored in the memory 932 may include one or more modules each corresponding to a set of instructions. In addition, the processing component 922 is configured to execute instructions to execute any of the above methods applied to the satellite, for example, the methods illustrated in FIGS. 3 to 5.

The satellite 900 may also include a power component 926 configured to perform power management of the satellite 900, a wired or wireless network interface 950 configured to connect the satellite 900 to a network, and an input/output (I/O) interface 958. The satellite 900 may operate an operating system stored in the memory 932, such as a windows Server™, a Mac OS X™, a Unix™, a Linux™, a FreeBSD™ or the like.

Other implementations of the disclosure may be apparent to the skilled in the art from consideration of the specification and practice of the disclosure disclosed here. This disclosure is intended to cover any variations, uses, or adaptations of embodiments of the disclosure following the general principles thereof and including such departures from the disclosure as come within known or customary practice in the art. It is intended that the specification and examples be considered as exemplary only, with a true scope and spirit of embodiments of the disclosure being indicated by the following claims.

It should be understood that embodiments of the disclosure is not limited to the exaction construction that has been described above and illustrated in the accompanying drawings, and that various modifications and changes may be made without departing from the scope thereof. The scope of embodiments of the disclosure only be limited by the appended claims.

The invention claimed is:

1. A method for configuring a period for synchronous signal block (SSB) measurement, performed by a terminal, comprising:

receiving ephemeris information of a serving cell satellite of a serving cell and ephemeris information of a neighboring cell satellite of a neighboring cell sent by the serving cell, wherein the ephemeris information of the serving cell is configured to determine a position of the serving cell satellite of the serving cell, and the ephemeris information of the neighboring cell is configured to determine a position of a neighboring cell satellite of the neighboring cell, detecting an SSB of the neighboring cell within the period for SSB measurement, wherein the period for SSB measurement comprises at least one of: an SSB measurement timing configuration (SMTC) window or a measurement gap; and reporting update indication information based on a detection result of the SSB, wherein the update indication information is configured to update a period configuration at a network side, and the period configuration comprises indication information for determining the period for SSB measurement, wherein reporting the update indication information based on the detection result of the SSB comprises:

determining a transmission delay difference, wherein the transmission delay difference comprises one of: a difference obtained by subtracting a transmission delay between the terminal and the serving cell from the transmission delay between the terminal and the neighboring cell, or a difference obtained by subtracting the transmission delay between the terminal and the neighboring cell from the transmission delay between the terminal and the serving cell; and reporting the update indication information based on the transmission delay difference.

2. The method of claim 1, wherein reporting the update indication information based on the detection result of the SSB comprises:

determining, based on the detection result of the SSB, that SSB detection for at least one neighboring cell fails; and reporting the update indication information.

3. The method of claim 1, wherein determining the transmission delay difference between the transmission delay from the terminal to the serving cell satellite of the serving cell and the transmission delay from the terminal to the neighboring cell satellite of the neighboring cell based on the detection result of the SSB comprises at least one of:

at least determining, based on the detection result of the SSB, a first transmission delay difference between the transmission delay from the terminal to the serving cell satellite and a transmission delay from the terminal to a neighboring cell satellite of a neighboring cell for which SSB detection fails, wherein the period configuration is not an initial period configuration; or determining, based on the detection result of the SSB, a second transmission delay difference between the transmission delay from the terminal to the serving cell satellite and a transmission delay from the terminal to a neighboring cell satellite of a neighboring cell for which the SSB detection succeeds, wherein the period configuration is an initial period configuration.

4. The method of claim 3, further comprising at least one of:

failing to detect N SSBs of the neighboring cell when performing the SSB measurement for the neighboring cell within one period for SSB measurement, and determining that the SSB detection fails once; or, successfully detecting the N SSBs of the neighboring cell when performing the SSB measurement for the neighboring cell within one period for SSB measurement, and determining that the SSB detection succeeds once; wherein N is less than or equal to a total number of SSBs configured for the neighboring cell within one period for SSB measurement.

5. The method of claim 3, wherein reporting the update indication information based on the transmission delay difference comprises:

reporting the update indication information based on the period configuration and the first transmission delay difference.

6. The method of claim 5, wherein reporting the update indication information based on the period configuration and the first transmission delay difference comprises at least one of:

reporting update indication information indicating a first range of delay differences based on the first transmission delay difference, wherein the period configuration is a public period configuration, a period for SSB measurement determined by the public period configuration is used for SSB measurement of all neighboring cells of the serving cell, and the first range of delay differences is determined based on a difference between the transmission delay from the terminal to the serving cell satellite and a transmission delay from the terminal to each of neighboring cell satellites of all neighboring cells;

reporting update indication information indicating a second range of delay differences based on the first transmission delay difference, wherein the period configuration is a group period configuration, the group period configuration is configured to determine a period for SSB measurement shared by all neighboring cells in a neighboring cell group of the serving cell, and the second range of delay differences is determined based on a difference between the transmission delay from the terminal to the serving cell satellite and a transmission delay from the terminal to a neighboring cell satellite of each neighboring cell in the neighboring cell group comprising a neighboring cell for which the SSB detection fails; or reporting update indication information indicating the first transmission delay difference based on the first transmission delay difference, wherein the period configuration is a cell period configuration, wherein the cell period configuration is configured to determine a period for SSB measurement of one neighboring cell of the serving cell.

7. The method of claim 6, wherein the difference between the transmission delay from the terminal to the serving cell satellite and the transmission delay from the terminal to the neighboring cell satellite is determined based on a position of the terminal, the ephemeris information of the serving cell satellite and the ephemeris information of the neighboring cell satellite.

8. The method of claim 3, further comprising:

determining that SSB detection for neighboring cell fails within M consecutive periods for SSB measurement, where M is an arbitrary positive integer; and determining that the detection result of the SSB corresponding to the neighboring cell indicates a failure.

9. A method for configuring a period for synchronous signal block (SSB) measurement, performed by a serving cell, comprising:

sending ephemeris information, wherein the ephemeris information comprises at least one of: ephemeris information of a serving cell satellite of the serving cell, or ephemeris information of a neighboring cell satellite of a neighboring cell, wherein the ephemeris information of the serving cell is configured to determine a position of the serving cell satellite of the serving cell, and the ephemeris information of the neighboring cell is configured to determine a position of a neighboring cell satellite of the neighboring cell,

receiving update indication information reported by a terminal; and updating a period configuration of the period for SSB measurement based on the update indication information, wherein the period configuration comprises indication information for determining the period for SSB measurement;

wherein updating the period configuration of the period for SSB measurement based on the update indication information comprises:

updating the period configuration of the period for SSB measurement based on a transmission delay difference carried by the update indication information, wherein the transmission delay difference comprises one of: a difference obtained by subtracting the transmission delay between the terminal and the serving cell from the transmission delay between the terminal and the neighboring cell, or a difference obtained by subtracting the transmission delay between the terminal and the neighboring cell from the transmission delay between the terminal and the serving cell.

10. The method of claim 9, wherein updating the period configuration of the period for SSB measurement based on the transmission delay difference carried by the update indication information comprises at least one of:

based on a first transmission delay difference carried by the update indication information, updating a period configuration of a period for SSB measurement of a neighboring cell corresponding to the first transmission delay difference according to a type of the period configuration corresponding to the first transmission delay difference, wherein the first transmission delay difference is a difference between a transmission delay from the terminal to a serving cell satellite of the serving cell and a transmission delay from the terminal to a neighboring cell satellite of each neighboring cell in a neighboring cell group comprising a neighboring cell for which SSB detection fails; or updating the period configuration based on a second transmission delay difference corresponding to an initial period configuration and carried by the update indication information, wherein the second transmission delay difference is a difference between the transmission delay from the terminal to a serving cell satellite of the serving cell and a transmission delay from the terminal to a neighboring cell satellite of each neighboring cell in a neighboring cell group comprising a neighboring cell for which the SSB detection succeeds.

11. The method of claim 10, wherein updating the period configuration of the period for SSB measurement of the neighboring cell corresponding to the first transmission delay difference according to the type of the period configuration corresponding to the first transmission delay difference comprises at least one of:

updating a public period configuration, wherein the period configuration corresponding to the first transmission delay difference is the public period configuration, and the public period configuration is configured to determine a period for SSB measurement shared by all neighboring cells of the serving cell;

updating a group period configuration, wherein the period configuration corresponding to the first transmission delay difference is the group period configuration, and the group period configuration is configured to determine a period for SSB measurement shared by all neighboring cells in a neighboring cell group of the serving cell; or updating a cell period configuration, wherein the period configuration corresponding to the first transmission delay difference is the cell period configuration, and the cell period configuration is configured to determine a period for SSB measurement of one neighboring cell of the serving cell.

12. The method of claim 9, wherein updating the period configuration of the period for SSB measurement based on the update indication information comprises:

determining a reference value based on the update indication information; and updating the period configuration based on the reference value and preset information for adjusting the reference value.

13. The method of claim 9, further comprising:

determining an initial period configuration of the period for SSB measurement based on a default range of transmission delay differences.

14. The method of claim 13, wherein the default range of transmission delay differences comprises at least one of:

a range from a first minimum value to a first maximum value, wherein the first minimum value is a minimum value of differences obtained by subtracting transmission delays between any position in the serving cell and neighboring cell satellites of all neighboring cells from a transmission delay between the any position in the serving cell and a serving cell satellite of the serving cell, and the first maximum value is a maximum value of the differences obtained by subtracting the transmission delays between any position in the serving cell and the neighboring cell satellites of all neighboring cells from the transmission delay between the any position in the serving cell and the serving cell satellite of the serving cell;

a range from a second minimum value to a second maximum value, wherein the second minimum value is a minimum value of differences obtained by subtracting a transmission delay between any position in the serving cell and a serving cell satellite of the serving cell from transmission delays between the any position in the serving cell and neighboring cell satellites of all neighboring cells, and the second maximum value is a maximum value of the differences obtained by subtracting the transmission delay between any position in the serving cell and the serving cell satellite of the serving cell from the transmission delays between the any position in the serving cell and the neighboring cell satellites of all neighboring cells;

a maximum range of transmission delay differences reported by the terminal accessing the serving cell; or a range of transmission delay differences determined based on historical data.

15. The method of claim 9, wherein updating the period configuration of the period for SSB measurement based on the update indication information comprises:

updating the period configuration based on the update indication information and a transmission delay of a feeder link, wherein the feeder link comprises at least one of: a feeder link between a gateway and the serving cell, or a feeder link between the gateway and the neighboring cell.

16. A communication device, comprising: a processor, a transceiver, a memory, an executable program stored on the memory and executed by the processor, wherein the processor is configured to execute the executable program to:

receive ephemeris information of a serving cell satellite of a serving cell and ephemeris information of a neighboring cell satellite of a neighboring cell sent by the serving cell, wherein the ephemeris information of the serving cell is configured to determine a position of the serving cell satellite of the serving cell, and the ephemeris information of the neighboring cell is configured to determine a position of a neighboring cell satellite of the neighboring cell, detect a synchronous signal block (SSB) of a neighboring cell within a period for SSB measurement, wherein the period for SSB measurement comprises at least one of: an SSB measurement timing configuration (SMTC) window or a measurement gap; and report update indication information based on a detection result of the SSB, wherein the update indication information is configured to update a period configuration at a network side, and the period configuration comprises indication information for determining the period for SSB measurement, wherein reporting the update indication information based on the detection result of the SSB comprises:

determining a transmission delay difference, wherein the transmission delay difference comprises one of: a difference obtained by subtracting a transmission delay between the terminal and the serving cell from the transmission delay between the terminal and the neighboring cell, or a difference obtained by subtracting the transmission delay between the terminal and the neighboring cell from the transmission delay between the terminal and the serving cell; and reporting the update indication information based on the transmission delay difference.

\* \* \* \* \*